US00RE46252E

(19) United States
(12) Reissued Patent
Kubota et al.

(10) Patent Number: US RE46,252 E
(45) Date of Reissued Patent: Dec. 27, 2016

(54) INKJET RECORDING APPARATUS AND RECORDING METHOD BY THE SAME

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Atsushi Kubota, Shizuoka-ken (JP); Kazuhiko Ohtsu, Shizuoka-ken (JP)

(73) Assignees: TOSHIBA TEC KABUSHIKI KAISHA, Tokyo (JP); KABUSHIKI KAISHA TOSHIBA, Tokyo (JP)

(21) Appl. No.: 14/170,902

(22) Filed: Feb. 3, 2014

Related U.S. Patent Documents

Reissue of:

(64) Patent No.: 8,459,770
Issued: Jun. 11, 2013
Appl. No.: 13/118,887
Filed: May 30, 2011

U.S. Applications:

(60) Provisional application No. 61/350,275, filed on Jun. 1, 2010.

(30) Foreign Application Priority Data

Jan. 13, 2011 (JP) ..... 2011-5125

(51) Int. Cl.
*B41J 29/38* (2006.01)
*B41J 11/00* (2006.01)

(52) U.S. Cl.
CPC ..... *B41J 11/009* (2013.01)

(58) Field of Classification Search
CPC ..... B41J 11/009
(Continued)

(56) References Cited

U.S. PATENT DOCUMENTS 5,532,789 A 7/1996 Yaginuma et al.
5,943,067 A * 8/1999 Kong ..... 347/2
(Continued)

FOREIGN PATENT DOCUMENTS

JP 04-218072 8/1992
JP 07-092863 4/1995
(Continued)

OTHER PUBLICATIONS

Office Action of Notification of Reason(s) for Refusal for Japanese Patent Application No. 2011-117881 Dated Aug. 7, 2014, 3 pages.
(Continued)

*Primary Examiner* — William Doerrler
(74) *Attorney, Agent, or Firm* — Amin, Turocy & Watson LLP

(57) ABSTRACT

In general, according to one embodiment, an inkjet recording apparatus includes an inkjet head, a conveyance motor, a discharge motor, a printing medium surface sensor and a controller. The inkjet head ejects ink on a printing medium. The discharge motor causes discharge of the printing medium. The printing medium surface sensor, locates at the upper-stream side of the inkjet head apart from the inkjet head in a printing medium conveyance direction, senses a foreign substance representing an image printed on the printing medium beforehand. The controller drives the discharge motor to discharge a printing medium without ejecting ink from the inkjet head if an after-printing mode in which printing is made on the printing medium on which the image is printed beforehand is not set if the foreign sub-
(Continued)

stance is detected on the printing medium through the printing medium surface sensor.

20 Claims, 7 Drawing Sheets

(58) Field of Classification Search
USPC ..... 347/16, 101, 105
See application file for complete search history.

(56) References Cited

U.S. PATENT DOCUMENTS

| | | | | |
|---|---|---|---|---|
| 6,236,831 | B1 * | 5/2001 | Mei | B41J 29/36 15/102 |
| 2009/0027729 | A1 * | 1/2009 | Trelewicz | H04N 1/405 358/3.06 |
| 2010/0053663 | A1 * | 3/2010 | Qian | B41J 11/009 358/1.15 |
| 2010/0227270 | A1 * | 9/2010 | Kazmaier | B41J 11/009 430/270.1 |
| 2011/0043562 | A1 | 2/2011 | Kubota et al. | 347/2 |
| 2011/0157267 | A1 * | 6/2011 | Kazmaier | B41J 11/009 347/9 |
| 2011/0193910 | A1 * | 8/2011 | Murakami | B41J 11/0035 347/16 |
| 2013/0250025 | A1 * | 9/2013 | Kaneko | B41J 29/38 347/179 |

FOREIGN PATENT DOCUMENTS

| | | |
|---|---|---|
| JP | 2004-299119 | 10/2004 |
| JP | 2007-148027 | 6/2007 |
| JP | 2008-132624 | 6/2008 |

OTHER PUBLICATIONS

U.S. Office Action mailed Dec. 24, 2012 corresponding to U.S. Appl. No. 13/118,887, filed May 31, 2011.

Japanese Office Action for Japanese Patent Application No. 2014-229520 mailed on Jul. 31, 2015.

* cited by examiner

INKJET RECORDING APPARATUS AND RECORDING METHOD BY THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is based upon and claims the benefit of priority from the prior U.S. Patent Application No. 61/350,275, filed on Jun. 1, 2010, the entire contents of which are incorporated herein by reference.

This application is also based upon and claims the benefit of priority from Japanese Patent Application No. 2011-5125, filed on Jan. 13, 2011, the entire contents of which are incorporated herein by reference.

TECHNICAL FIELD

Embodiments described herein relate to an inkjet recording apparatus and a recording method thereof.

BACKGROUND

Various kinds of recording apparatus using different printing mechanisms are installed in offices, etc. A typical recording apparatus are a recording apparatus which is equipped with an electro-photographic mechanism, and a recording apparatus which uses an inkjet mechanism.

In an inkjet recording apparatus, ink ejected from nozzles adheres on the surface of a recording medium. Ink adhering to the recording medium diffuses on the surface of the recording medium and permeates into the medium in a thickness direction thereof. Then, ink adhering to the recording medium is dried and fixed on the recording medium. The inkjet recording apparatus records an image on the recording medium with the mechanism of permeating, drying and fixing of ink.

For saving resources, a recording apparatus that produces prints using a recycled paper is available in recent years. In such a recording apparatus, an image on the recording medium printed with an erasable toner is erased, and the recording medium is used again to be printed with the electrophotographic mechanism.

However, the image formed with the above-described mechanism using the erasable toner still remains on the recording surface of the recording medium as a transparent resin even after an erasing process is performed. Accordingly, in case that the inkjet recording apparatus records an image on the recording surface of the recording medium on which the erasing process is once performed, ink adhering to the recording surface of the recording medium is adversely affected by the transparent resin on the medium and an image formed therewith is distorted. Therefore, an image quality of the image formed on the recording medium finally deteriorates.

DETAILED DESCRIPTION

In general, according to one embodiment, an inkjet recording apparatus includes an inkjet head, a conveyance motor, a discharge motor, a printing medium surface sensor and a controller. The inkjet head ejects ink on a printing medium. The conveyance motor causes conveyance of the printing medium. The discharge motor causes discharge of the printing medium. The printing medium surface sensor, locates at the upper-stream side of the inkjet head apart from the inkjet head in a printing medium conveyance direction, senses a foreign substance representing an image printed on the printing medium beforehand. The controller drives the discharge motor to discharge a printing medium without ejecting ink from the inkjet head if an after-printing mode in which printing is made on the printing medium on which the image is printed beforehand is not set if the foreign substance is detected on the printing medium through the printing medium surface sensor, or drives the discharge motor to discharge a printing medium after ejecting ink on the printing medium from the inkjet head if the after-printing mode is set if the foreign substance is detected on the printing medium through the printing medium surface sensor.

Hereinafter, embodiments will be described.

First Embodiment

Figure 1:
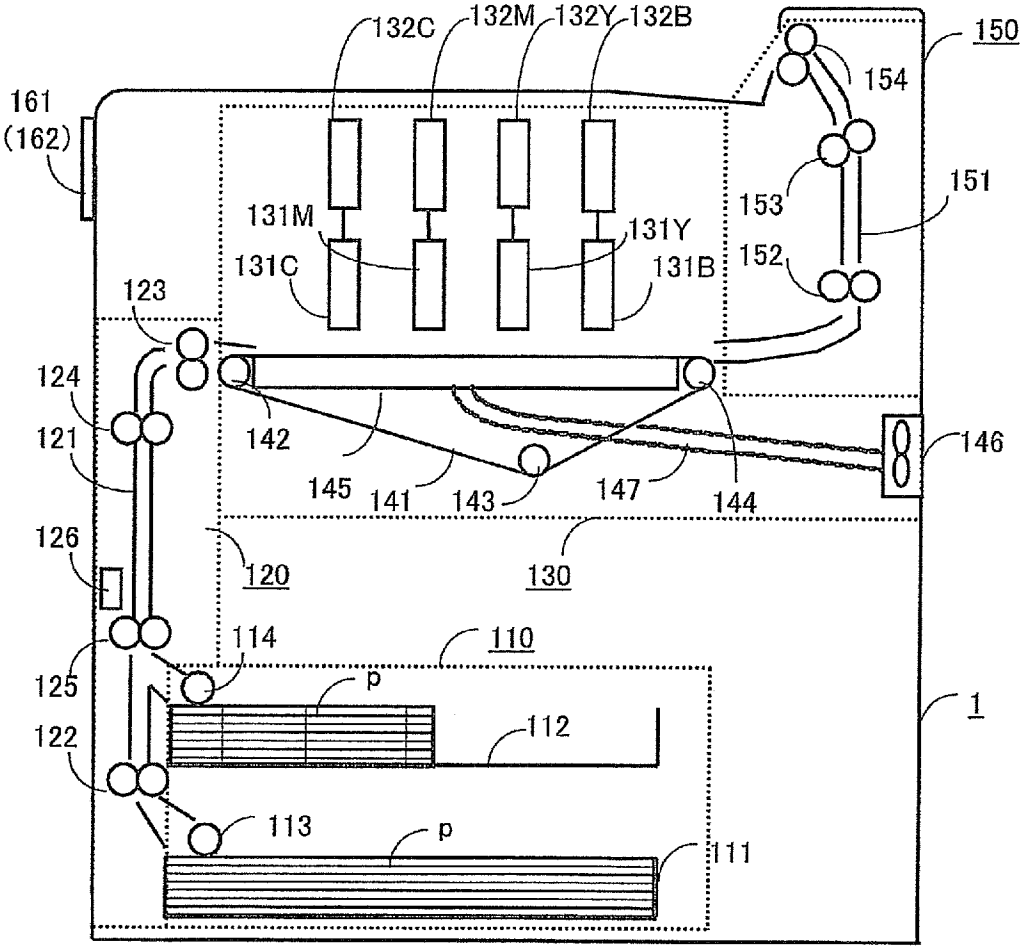
FIG. 1 is a longitudinal cross sectional view illustrating an inkjet recording apparatus according to an embodiment.

A first embodiment is described referring to FIG. 1 to FIG. 4. FIG. 1 is a longitudinal cross sectional view of an inkjet recording apparatus 1 according to the first embodiment. The inkjet recording apparatus 1 is provided with a paper supply section 110, a paper feed section 120, an image recording section 130, a paper discharge section 150, a display section 160, etc.

The paper supply section 110 is provided with a first printing medium (paper) cassette 111, a second printing medium (paper) cassette 112, a first pick-up roller 113, a second pick-up roller 114, etc. The first paper cassette 111 stores a plurality of papers. The first pick-up roller 113 is in contact with the surface of the upper-most paper stored in the first paper cassette 111, and picks up a paper one by one from the first paper cassette 111. The second paper cassette 112 stores papers having a size different from that of papers in the first paper cassette 111. The second pick-up roller 114 is in contact with the surface of the upper-most paper stored in the second paper cassette 112, and picks up a paper one by one from the second paper cassette 112.

The paper feed section 120 has a paper guide pair 121 for conveying the paper supplied from either the first paper cassette 111 or the second paper cassette 112, a plurality of conveyance roller pairs 122 to 124 arranged along the paper guide pair 121, a resist roller pair 125 provided on the paper guide pair 121, a medium surface sensor 126 (a paper sensor) for detecting a transparent resin which is a foreign substance on the printing surface of a paper. The resist roller pair 125 is located at a lower stream side in the paper conveyance direction from a part at which a paper guide of a paper picked up by the first pick-up roller 113 and a paper guide of a paper picked up by the second pick-up roller 114 are joined. The paper sensor 126 is arranged near the resist roller pair 125 at a lower stream side therefrom in the paper conveyance direction.

The image recording section 130 includes a plurality of inkjet heads 131 which ejects ink to a paper in response to data, a plurality of ink cartridges 132, in which ink is respectively stored, corresponding to the inkjet heads 131, a conveyance belt 141 for conveying the paper, a plurality of the rollers 142, 143 and 144 arranged at an inner side of the conveyance belt 141 to stretch the belt 141, a negative pressure chamber 145 also provided beneath the conveyance belt 141, a fan 146 for discharging air, and a duct 147 connecting the negative pressure chamber 145 and the fan 146.

A plurality of inkjet heads 131 includes an inkjet head 131C which ejects cyan ink, an inkjet head 131M which ejects magenta ink, an inkjet head 131Y which ejects yellow ink and an inkjet head 131B which ejects black ink. In these ink jet heads 131, nozzles of each head for ejecting ink in a direction perpendicular to the paper conveyance direction are arranged in line at a predetermined resolution, respectively. That is, nozzles of the inkjet head 131 are arranged over the width of a paper conveyed. The plurality of inkjet heads 131 having such nozzles described above are arranged such that the inkjet head 131C, the inkjet head 131M, the inkjet head 131Y and the inkjet head 131B are located in the order described from the upper stream side in the paper conveyance direction. The inkjet head 131C is connected with an ink cartridge 132C which is charged with cyan ink. The inkjet head 131M is connected with an ink cartridge 132M which is charged with magenta ink. The inkjet head 131Y is connected with an ink cartridge 132Y which is charged with yellow ink. The inkjet head 131B is connected with an ink cartridge 132B which is charged with black ink.

The inkjet head 131 and the paper sensor 126 are arranged to the paper guide pair 121 at the same side. Therefore, the paper sensor 126 detects the state of a printing surface of the paper whose printing surface is printed by the inkjet heads 131 at the lower stream side in the paper conveyance direction. Also, a distance between the inkjet head 131C and the paper sensor 126 is longer than the length of the first paper cassette 111 and the second paper cassette 112 in the paper conveyance direction. Therefore, the paper length in the paper conveyance direction set at the first paper cassette 111 and the second paper cassette 112 is shorter than the distance between the inkjet head 131C and the paper sensor 126. By this relationship, the front edge of a paper reaches the inkjet head 131C which locates at the upper-most stream side in the paper conveyance direction after the paper sensor 126 detects the state of the entire printing surface of the paper even if papers having any one of sizes are stored in the first paper cassette 111 or the second paper cassette 112 as long as the papers are housed within the paper cassette 111, 112.

The conveyance belt 141 is stretched in an endless manner between a drive roller 142 and two driven rollers 143 and 144, as shown in FIG. 1. The drive roller 142 conveys the paper from the paper feed section 120 through the conveyance belt 141 to the paper discharge section 150. The conveyance belt 141 is given a tensile force with the drive roller 142 and driven rollers 143 and 144. The conveyance belt 141 has many holes arranged at predetermined intervals at its surface. The negative pressure chamber 145 connected with the fan 146 is arranged inside the conveyance belt 141. The paper from the paper feed section 120 is suck with the negative pressure chamber 145 through the holes on the conveyance belt 141 and is stuck on the belt 141. A gap between the inkjet head 131 and the conveyance belt 141 is kept constant by the negative pressure chamber 145.

The paper discharge section 150 is provided with a paper discharge guide pair 151 and a plurality of discharge rollers 152 to 154 arranged along the paper discharge guide pair 151. The inkjet recording apparatus 1 is structured to discharge a paper in a state of the facedown by the discharge roller 152 to 154. The paper is not limited to be discharged in a state of facedown and it may be discharged in a state of face up.

The display section 160 is provided on an upper part of the inkjet recording apparatus 1. The display section 160 has functions of an operation display 161 which displays the state of the apparatus 1 and various messages to a user, and an operation panel 162 which is a touch panel for enabling a user to input an instruction, etc. For example, the display 161 displays various kinds of error messages and a message "Now Printing" as well. The operation panel 162 has a mode selection button. The operation panel 162 may include a button which validates (sets) an after-printing mode in which a paper on which a fixed form is printed beforehand is used to print an image on the fixed form.

Figure 2:
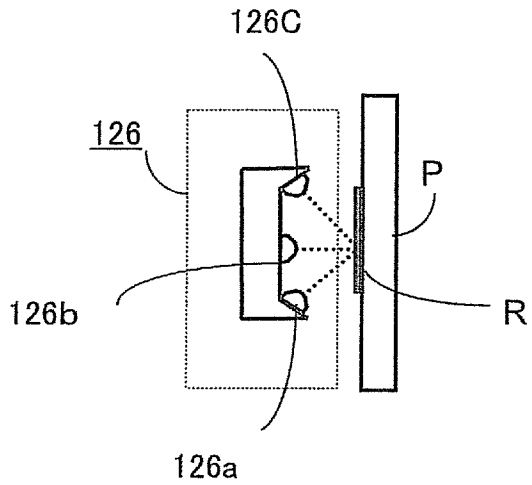
FIG. 2 is a diagram representing configuration of a recording medium sensor unit according to the embodiment.

Next, the paper sensor 126 is explained with reference to FIG. 2. The paper sensor 126 senses whether or not the printing surface of a paper to be printed is printed with a foreign substance (color material) R, etc. other than ink for inkjet. For example, a foreign substance is a resin which is used in an electro-photographic printer or a thermal printer. A colorless resin remains on the paper even if color material of printing is decolorized with heat by a color erasing apparatus after the paper is once printed with an electro photography. The paper sensor 126 can detect toners of different kind, such as, black toner and color toner, that have a light reflection characteristic different from one the other.

The paper sensor 126 is a reflection type sensor. The paper sensor 126 includes a light source 126a, a first photo-reception element 126b, a second photo-reception element 126c, etc. The light source 126a is an LED (light emitting diode). The first photo-reception element 126b is a photo-coupler which receives a diffusion reflection light reflected from the printing surface of the paper. The second photo-reception element 126c which receives a mirror-surface reflection light and the diffusion reflection light from the printing surface of the paper. A plurality of the light sources 126a, the first photo-reception elements 126b, and the second photo-reception elements 126c are respectively arranged with no gap in line in a direction perpendicular to the paper conveyance direction in FIG. 1.

Figure 3:
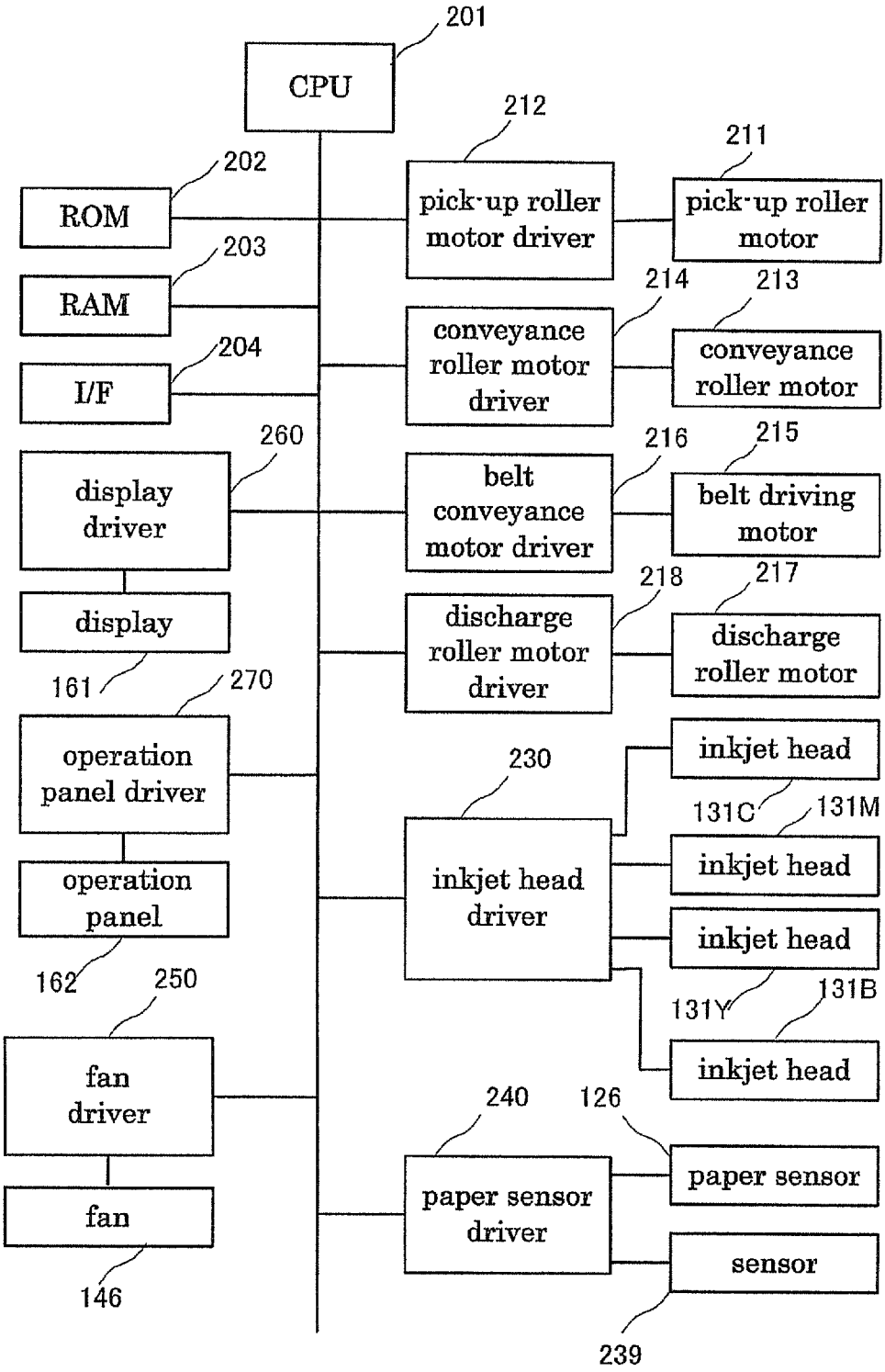
FIG. 3 is a block diagram illustrating a controlling system of the inkjet recording apparatus shown in FIG. 1.

Next, FIG. 3 is a block diagram illustrating the inkjet recording apparatus 1 according to the present embodiment. The inkjet recording apparatus 1 includes a CPU (Central Processing Unit) 201 which is a controller, a ROM (Read Only Memory) 202 which stores various programs, etc., a RAM (Random Access Memory) 203 which stores temporarily various kinds of variable data, image data etc., an interface (I/F) which inputs data from an external apparatus or outputs data to the external apparatus. The inkjet recording apparatus 1 includes a pick-up roller motor driver 212 which controls a feed roller motor 211 coupled with the first pick-up roller 113 and the second pick-up roller 114, a conveyance roller motor driver 214 which controls a conveyance roller motor 213 coupled with the conveyance roller pairs 122, 123 and 124 and the resist roller pair 125, a belt drive motor driver 216 which drives a belt driving motor 215 coupled with the driving roller 142, a discharge roller motor driver 218 which controls a discharge roller motor 217 coupled with the discharge roller pairs 152, 153 and 154.

It should be noted that the feed roller motor 211, the conveyance roller motor 213, the belt driving motor 215, and the discharge roller motor 217 may be constituted by a single motor and a switch-over mechanism (not shown). The inkjet recording apparatus 1 further includes an inkjet head driver 230 which controls the inkjet head 131C, the inkjet head 131M, the inkjet head 131Y and the inkjet head 131B. The inkjet recording apparatus 1 still further includes a sensor driver 240 which controls the paper sensor 126 and other sensor 239, a fan driver 250 which controls the fan 146, a display driver 260 which controls the display 161, and an operation panel driver 270 which controls the operation panel 162.

The CPU 201 connects with the ROM 202, the RAM 203, the I/F 204, the feed roller motor driver 212, the conveyance roller motor driver 214, the belt conveyance motor driver 216, the inkjet head driver 230, the sensor driver 240, the fan driver 250, the display driver 260 and the operation panel driver 270 through a bus line including data bus, control bus, address bus, etc. The inkjet head 131C, the inkjet head 131M, the inkjet head 131Y and the inkjet head 131B eject ink respectively on a paper from nozzles thoseof in response to image signals from the inkjet head driver 230.

Next, a portion relating to the paper sensor 126 and the sensor driver 240 are explained in detail. The sensor driver 240 includes a differential circuit (not shown) for controlling the paper sensor 126. The differential circuit senses whether foreign substances (transparent resin) other than ink for inkjet remain on the printing surface of the paper based on each output of the first photo-reception element 126b and the second photo-reception element 126c or whether any mark already printed on the surface of the paper with a coloring material other than ink exists. That is, the differential circuit senses whether it is printed on the paper with a color toner based on the output of the first photo-reception element 126b. Also, the differential circuit senses whether it is printed on the paper with a black toner based on the output of the second photo-reception element 126c. Therefore, the paper sensor 126 can also sense whether printing is performed on the paper with toners having different light reflection characteristics, such as, e.g., a black toner and a color toner. Here, if a transparent resin remains on the printing surface of a paper or printing is performed on the printing surface thereof with a color material other than ink for inkjet, such a paper is defined as a printed paper. If a transparent resin does not remain on the printing surface, or printing is not performed on the printing surface with a color material other than ink for inkjet, such a paper is defined as a non-printed paper.

Next, operation of the first embodiment is described with reference to the flow chart of FIG. 4.

Figure 4:
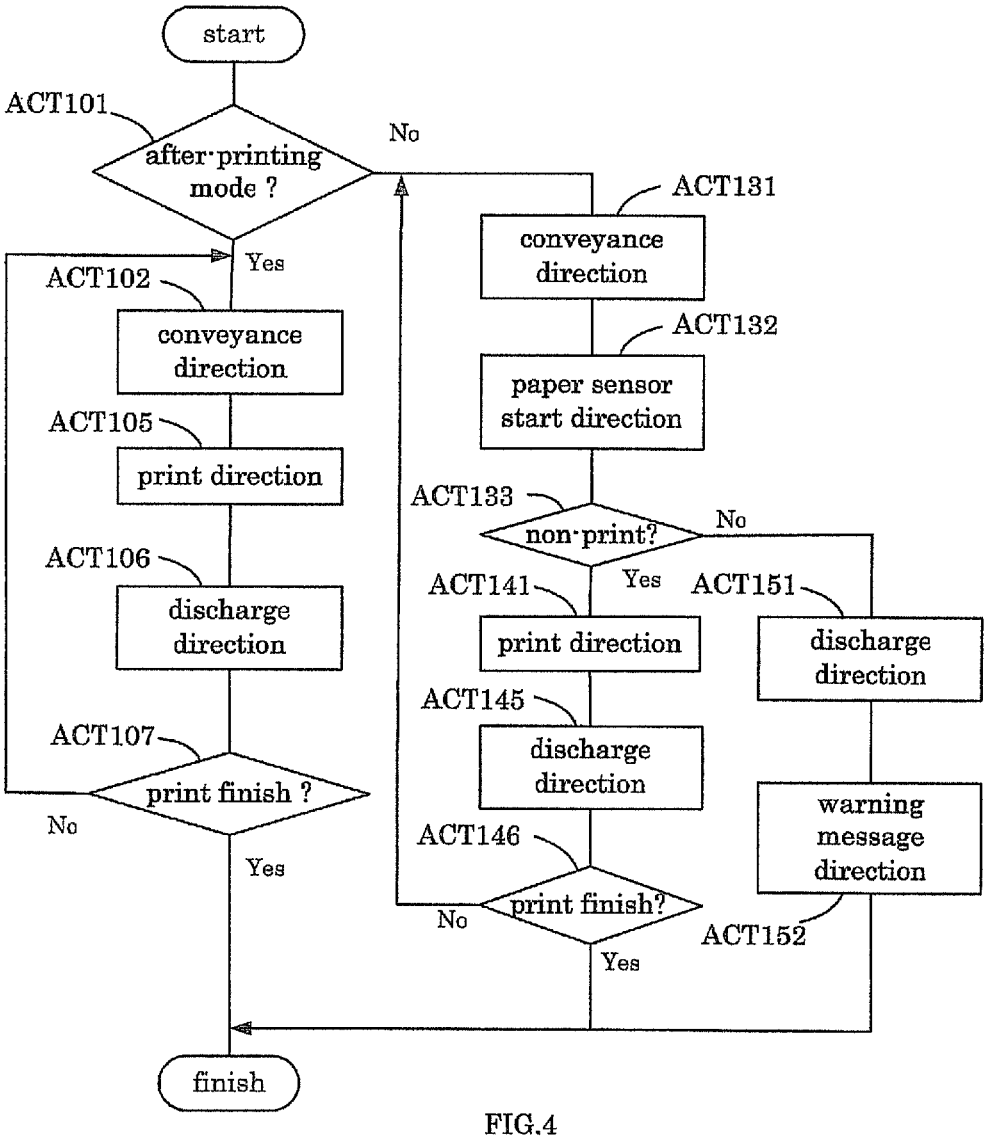
FIG. 4 is a flowchart representing an image forming process according to a first embodiment.

If the CPU 201 receives data from the external apparatus, such as a personal computer, the CPU starts control shown in the flow chart in FIG. 4. The CPU 201 judges whether the after-printing mode is instructed in the data sent from the external apparatus (ACT 101). For example, it is possible by the driver of the external PC to instruct that the after-printing mode is valid/invalid. If the CPU 201 determines that the after-printing mode is performed according to the data from the external apparatus, that is, the after-printing mode is valid (Yes in ACT 101), the CPU 201 directs the feed roller motor driver 212 to drive the feed roller motor 211 (ACT 102). The CPU 201 directs the conveyance roller motor driver 214 to drive the conveyance motor 213 and the CPU 201 also directs the belt drive motor driver 216 to drive the belt driving motor 215, as well.

A prescribed time after the CPU 201 directs the feed roller motor driver 212 to feed paper, the CPU 201 directs the inkjet head driver 230 to drive the inkjet heads 131C, 131M, 131Y and 131B according to data sent from the external apparatus (ACT 105). At this time, the CPU 201 disregards the output from the paper sensor 126. Also, the CPU 201 directs the roller motor driver 218 to drive the discharge roller 217 (ACT 106). The CPU 201 judges whether print directions regarding all data from the external apparatus are made or not (ACT 107). If the CPU 201 determines that all print directions are made (Yes in ACT 107), the CPU 201 finishes this process. If the CPU 201 determines, however, that not all print directions are made (No in ACT 207), the process returns to ACT 102.

If the CPU 201 determines that the after-printing mode is not instructed, or after-printing mode is invalid (No in ACT 101), the CPU 201 directs the feed roller motor driver 212 to drive the feed roller motor 211 (ACT 131). If the CPU 201 does not find a cord representing the after-printing mode in data sent from the external device, the CPU 201 performs a process as the after-printing mode being invalid. Also, in ACT 131, the CPU 201 directs the conveyance roller motor driver 214 to drive the conveyance roller motor 213 together with the belt drive motor driver 216 to drive the belt drive motor 215. A prescribed time after the CPU 201 directs the conveyance roller motor driver 214 to drive conveyance roller motor 213, the CPU 201 directs the sensor driver 240 to activate the paper sensor 126 (ACT 132). If the paper sensor driver 240 receives direction from the CPU 201, the sensor driver 240 activates the paper sensor 126 during a time that the paper passes over the paper sensor 126 from its front edge to its rear edge to detect the state of the printing surface of the paper.

If the CPU 201 finishes sensing of an entire printing surface of the paper (Yes in ACT 132), the CPU 201 judges whether the paper is a non-printed paper (Yes in 133). If the CPU 201 determines that the paper is not printed (Yes in ACT 133), the CPU 201 performs the ACT 141. Since content of the action of ACT 141 is the same as that of the ACT 105 in FIG. 4, description thereof is omitted. Also, the CPU 201 directs the discharge roller motor driver 218 to drive the discharge roller motor 217 (ACT 145). The CPU 201 judges whether print directions for all data from the external apparatus are made (ACT 146). IF the CPU 201 determines that all print commands are made (Yes in ACT 146), the CPU 201 finishes this process. IF the CPU 201 determines that not all print directions are made (No in ACT 146), the process returns to ACT 131.

If the CPU 201 determines that the paper is not a non-recorded paper, that is, a foreign substance such as a transparent resin is detected on the printing surface of the paper (No in ACT 133), the CPU 201 directs the discharge roller motor driver 218 to drive the discharge roller motor 217 (ACT 151). At the time the CPU 201 directs the motor driver 218 to discharge the paper in ACT 151, the CPU 201 does not make the print direction to the inkjet head driver 230. Namely, the paper is simply discharged without being printed on the surface thereof. The CPU 210 sends a warning message that the paper is already printed to the external apparatus which transmits print data through the I/F 204

(ACT 152). The CPU 201 may direct the display driver 260 to display a message that the paper is already printed on the display 161.

In the above-described first embodiment, it is not limited to the above, and it may perform the following actions, instead. If the CPU 201 receives only text data from the external apparatus, the CPU 201 may make that the after-printing mode is valid in ACT 146. Also, if the CPU 201 receives data which includes only a fixed form composed of a ruled line, the CPU 201 may make that the after-printing mode is valid in ACT 146. In addition, if the CPU 201 receives only a single color data, in particular, black color data from the external apparatus, the CPU 201 may also make that the after-printing mode is valid in ACT 146.

The CPU performs a paper supply operation for the paper after directing the printing of data in ACT 141 and the data subject to the print direction is printed on the paper supplied. In case that data is printed on more than one paper as one print job, if a printed paper is supplied, the printed paper is simply discharged and data is printed on the next paper. Therefore, data can be completely printed without missing part of data even if only one printed paper is mixed in the papers stored in first or second paper cassette 111, 112. The CPU 201 may perform an operation in changing in order ACT 145 and ACT 146. The first embodiment is described in case that data sent from the external device is printed. However, it may realize the invention by the copying operation if the inkjet recording apparatus is a copying machine.

According to the first embodiment, if the CPU 201 detects based on the output of the paper sensor 126 that a foreign substance is present on the printing surface of the paper in a state that the after-printing mode is invalid, the CPU 201 discharges the paper by the discharge roller motor 217 without ejecting ink from the inkjet heads 131C, 131M, 131Y and 131B. However, if the CPU 201 detects a foreign substance on the printing surface in a state that the after-printing mode is valid, the CPU 201 directs the inkjet heads 131C, 131M, 131Y and 131B to eject ink on the paper on which a foreign substance is present, and directs the discharge roller motor 217 to discharge the paper thereafter. Therefore, the inkjet recording apparatus 1 can perform an after-printing that data is printed afterward on the printing surface of the paper on which printing is already performed by an apparatus other than the inkjet recording apparatus.

Second Embodiment

Next, an operation of a second embodiment is described with reference to the flowchart of FIG. 5 and the sub flow chart of FIG. 6.

Figure 5:
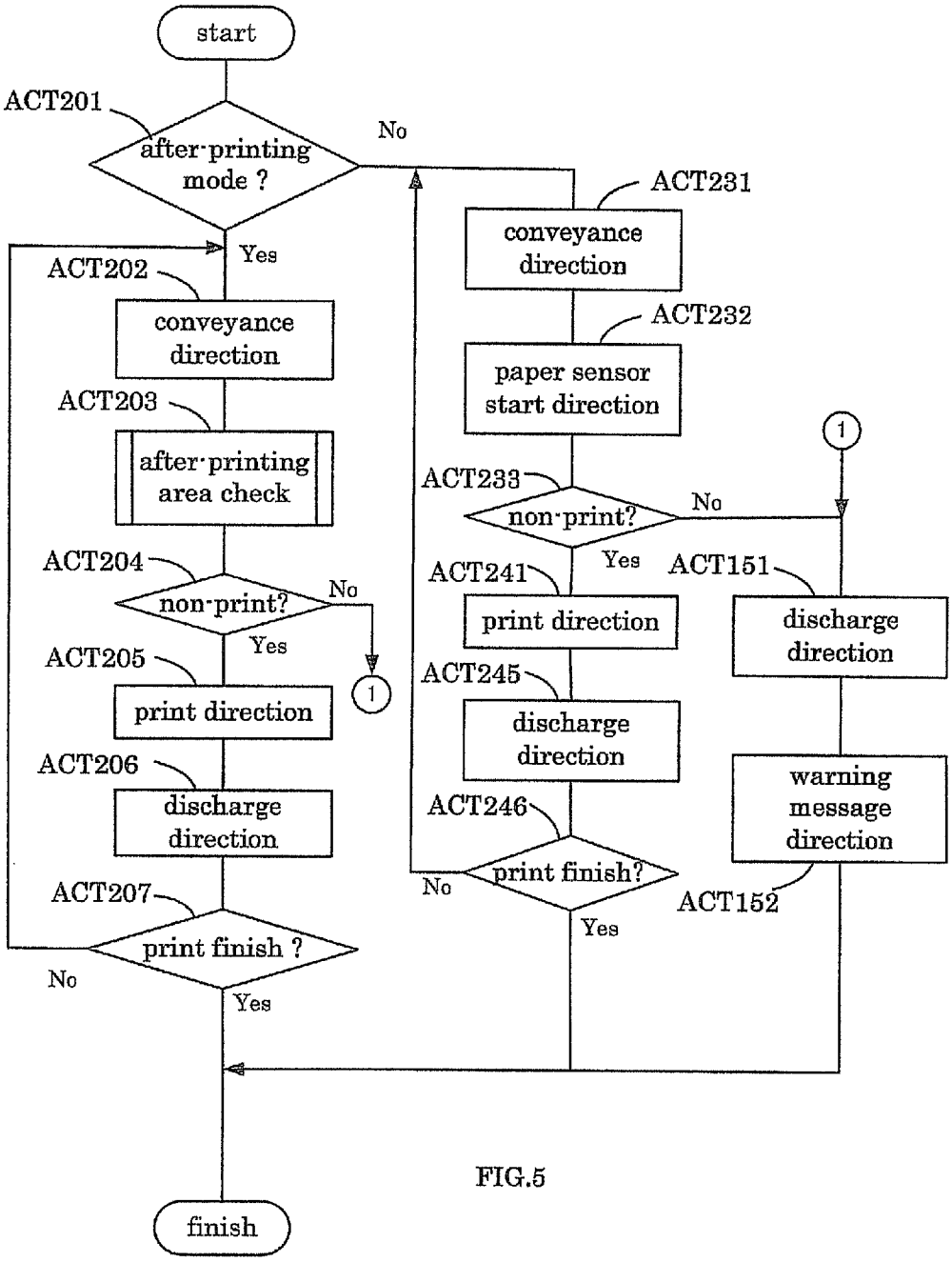
FIG. 5 is a main flowchart representing an image forming process according to a second embodiment.
Figure 6:
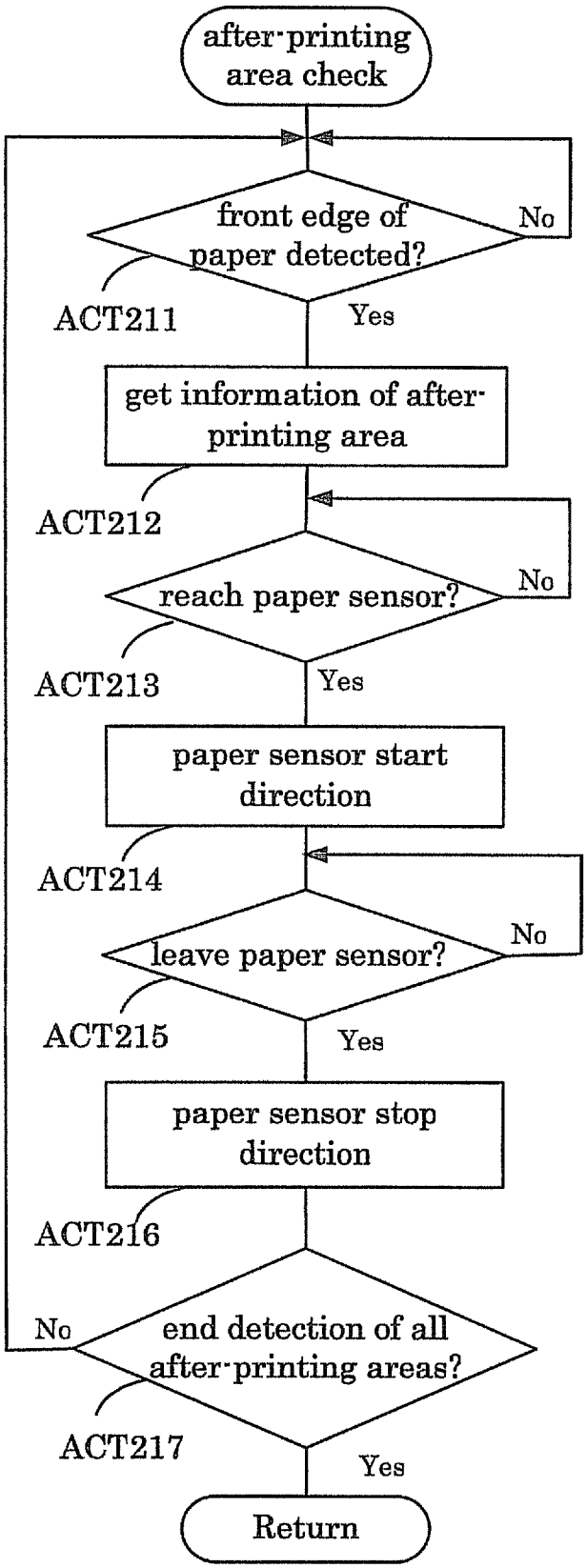
FIG. 6 is a sub flowchart representing an image forming process according to a second embodiment.

Since actions of ACT 201 and ACT 202 in FIG. 5 are the same as those of ACT 101 and ACT 102 in FIG. 4, descriptions of ACT 201 and ACT 202 are omitted.

In ACT 203, the CPU 201 checks the after-printing area of the paper conveyed.

The CPU 201 judges whether a front edge of the paper is detected (ACT 211). If the CPU 201 determines that the front edge of the paper is detected (Yes in ACT 211), the CPU 201 gets information of a printing area (after-printing area) on the paper on which the after-printing is performed from data sent by the external apparatus (ACT 212). The CPU 201 judges whether the after-printing area of the paper based on the information obtained at the ACT 212 arrives at the paper sensor 126 (ACT 213). If the CPU 201 determines that the after-printing area of the paper reaches the paper sensor 126 (Yes in ACT 213), the CPU 201 directs the paper sensor driver 240 including the differential circuit to activate the paper sensor 126 (ACT 214). The differential circuit detects a state of the printing surface (after-printing area) of the paper through the paper sensor 126. Then, the CPU 201 judges whether the after-printing area of the paper leaves the paper sensor 126 (Act 215). If there are a plurality of after-printing areas on the printing surface of a single paper, the CPU 201 judges whether a first after-printing area of the paper passes over the paper sensor 126. If the CPU 201 determines that the first after-printing area passes the paper sensor 126 (Yes in ACT 215), the CPU 201 directs the paper sensor driver 240 to stop sensing by the paper sensor 126 (ACT 216).

The CPU 201 judges whether detection to the state of all the after-printing areas of the paper is ended (ACT 217). If the CPU 201 determines that detection to the state of all the after-printing areas is ended (Yes in ACT 217), the CPU 201 ends the processes shown in FIG. 6.

On the other hand, the CPU 201 determines that detection to the state of not all the after-printing areas is ended (No in ACT 217), the process returns to the ACT 211. In case that (N) after-printing areas are formed on the printing surface of the single paper and the CPU 201 detects a foreign substance (transparent resin) on one of the after-printing areas, e.g., N−2, before finishing examination to all the after-printing areas (N), the CPU 201 may end the detection process as all the after-printing areas being examined even if some after-printing areas that are not examined still remain. This is because that the paper is determined as a recorded paper if a foreign substance is found at least one of the after-printing areas even if a foreign substance is not found on remaining after-printing areas.

Returning to FIG. 5, description is continued. If the CPU 201 finishes confirmation of the after-printing areas of the paper conveyed (ACT 203), the CPU 201 judges whether the paper is non-recorded (ACT 204). If the CPU 201 determines that the confirmed paper is a non-recorded paper (Yes in ACT 204), the CPU 201 directs the inkjet head driver 230 to perform printing (ACT 205). In the second embodiment, since actions from ACT 205 to ACT 207 in FIG. 5 are the same as those from ACT 105 to ACT 107 in the first embodiment shown in FIG. 4, the descriptions thoseof are omitted.

If the CPU 201 determines that the paper is not a non-recorded paper, namely a recoded paper (No in ACT 204), the CPU 201 directs the discharge roller motor driver 218 to drive the discharge roller motor 217 (ACT 251). If the CPU 201 directs the driver 218 to discharge the paper at ACT 251, the CPU 201 does not make a printing direction to the inkjet head driver 230. The paper is discharged without being printed. The CPU 201 directs the I/F 204 to send a message that the paper is a recorded paper to the external apparatus which sends data to the I/F 204 (ACT 252).

In the second embodiment, because the actions of ACT 231 to ACT 246 in FIG. 5 are the same as that of ACT 131 to ACT 146 of the first embodiment shown in FIG. 4, the descriptions of ACT 231 to ACT 246 are omitted.

As a modification, the case where the after-printing mode is set from the operation panel of the inkjet recording apparatus 1 is described.

In this modification, a scanner (not shown) which reads an image on a paper is mounted on the upper part of the inkjet recording apparatus shown in FIG. 1. The CPU 201 of the inkjet recording apparatus judges whether the after-printing mode is setup from the operation panel. If the CPU 201 determines that the after-printing mode is valid (after-printing mode is setup), the CPU 201 directs the scanner to read a paper. At this time, a judgment sheet indicating which area is an after-printing area is read by the scanner. The judgment sheet shows which portion of the paper is an after-printing area. For example, the area on the paper corresponding to the after-printing area is indicated by painting in black, by surrounding in square or by hatching. The CPU 201 memorizes the information of the after-printing area based on the information (indicated area) read from the judgment sheet. Since the subsequent actions are the same as that of ACT 202 to ACT 207 in FIG. 5, descriptions thoseof are omitted.

According to the second embodiment, since only the after-printing area is examined, the after-printing operation can be performed without wasting paper even if a transparent resin (foreign substance) is present at an area on the paper other than the after-printing area.

Third Embodiment

Figure 7:
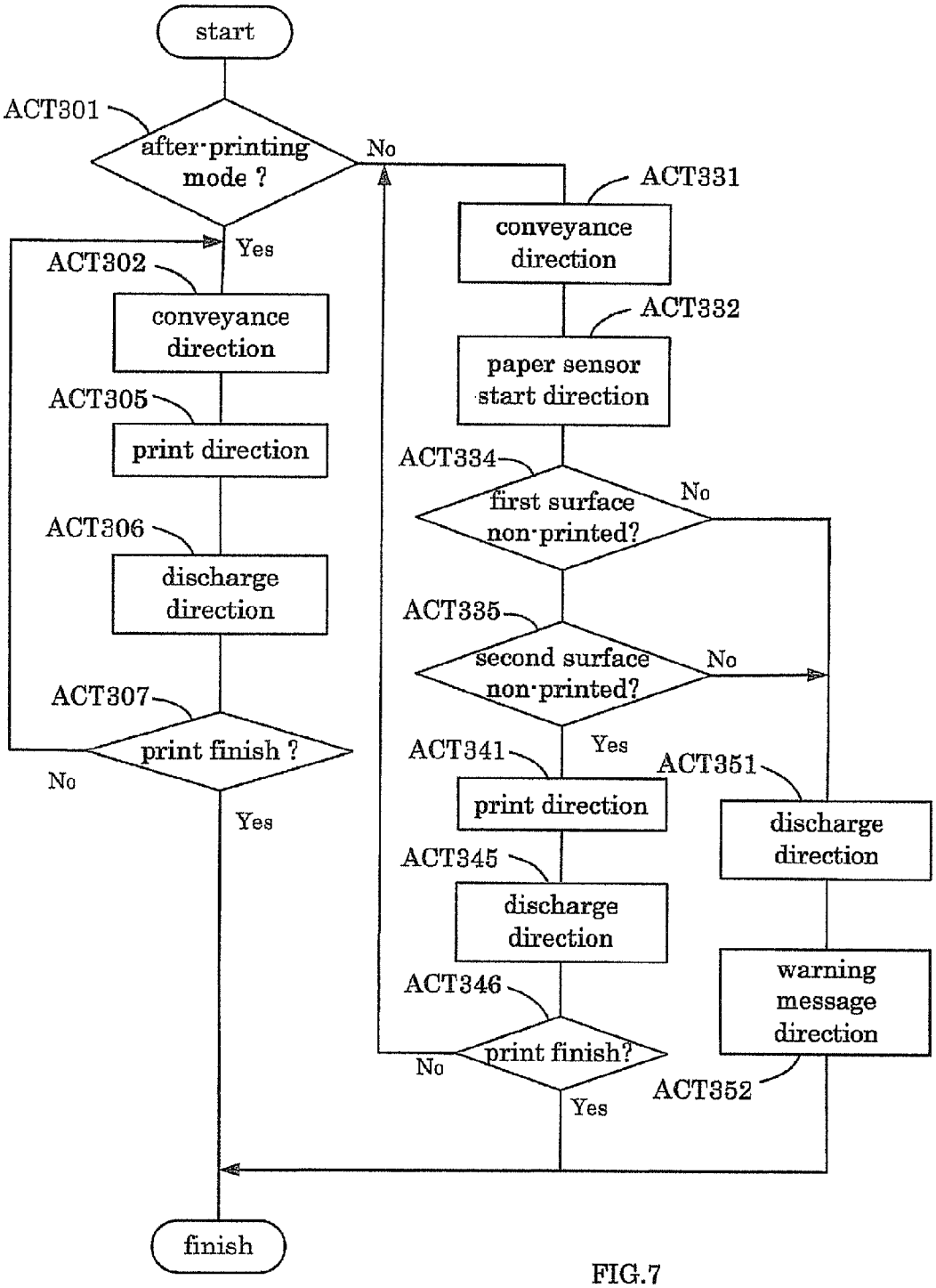
FIG. 7 is a flowchart representing an image forming process according to a third embodiment.

Next, a third embodiment is described using the flow chart of FIG. 7.

According to the third embodiment, sensing to both surfaces (front and rear surfaces) of the paper differs from the first and second embodiments. In the third embodiment, one more paper sensor (second paper sensor) other than the paper sensor 126 in FIG. 1 is disposed opposite to the paper sensor 126 with the conveyance guide pair 121 therebetween. In the third embodiment, sensor 239 in FIG. 3 is indicated as a second paper sensor.

In the third embodiment, the actions of ACT 301 to ACT 332 in FIG. 7 are the same as those of ACT 101 to ACT 132 of the first embodiment shown in FIG. 4, and therefore the descriptions of ACT 301 to ACT 332 are omitted.

After the process of ACT 331 is carried out, the CPU 201 directs the paper sensor driver 240 to drive the paper sensor 126. At this time, the CPU 201 issues a direction so that two paper sensors disposed at both sides of conveyance guide pair 121 are driven. After a single paper passes between the two paper sensors 126 located opposite to one the other, the CPU 201 judges whether one side surface is a non-recorded surface (ACT 334). If the CPU 201 determines that the one side surface is a non-recorded surface (Yes in ACT 334), the CPU 201 further judges whether the other side surface is a non-recorded surface (ACT 335). In the third embodiment, one side surface is defined as a first surface, and the other side surface is defined as a second surface.

In the third embodiment, the actions of ACT 341 to ACT 346 are correspondingly the same as those of ACT 141 to ACT 146 of the first embodiment, and therefore the descriptions of ACT 341 to ACT 346 are omitted. If the CPU 201 determines that the first surface is a recorded surface (No in ACT 334), or the second surface is a recorded surface (No in ACT 335), the CPU 201 directs the discharge roller motor driver 218 to drive the discharge roller motor 217 without outputting a printing direction to the inkjet head driver 240. Also, the CPU 201 directs the I/F 204 to send a message that the paper is a recorded paper to the external apparatus which transmits print data to the I/F 204 (ACT 352).

In the third embodiment, the paper sensors 126 and 239 are disposed oppositely at the outsides of conveyance guide pair. However, a well known paper reverse mechanism (not shown) may be provided between the paper feed section 120 and the image recording section 130. By using such a paper reverse mechanism, the state of the first and second printing surfaces of the paper can be examined by one paper sensor 126. The above-described paper reverse mechanism may be configured to be commonly used as a mechanism or printing both surfaces of a paper and for sensing both surfaces of the paper.

According to the third embodiment, the CPU 201 judges whether both side surfaces of a paper are not printed before printing is performed. The CPU 201 permits printing on only a paper both side surfaces of which are not printed. If a foreign substance is present on only one side surface of a paper but is not present on the other side surface, the CPU 201 directs that the paper be discharged forcibly. Therefore, it can be avoided that the paper is forcibly discharged due to the foreign substance on the other side surface of the paper after one side surface is printed.

In each embodiment, description is made as the paper sensor being a line sensor. However, the paper sensor may be a sensor that is moved in a direction perpendicular to the conveyance direction of a paper to examine the surface of the paper. Also, description is made as the inkjet head being a fixed type, i.e., a line head. However, a movable type (shuttle type) inkjet head that is moved in a direction perpendicular to the conveyance direction of a paper may be used to carry out printing on the paper. In addition, the paper sensor may dispose on a carriage on which the inkjet head is mounted. However, in this case, if a foreign substance on the surface of the paper is detected in the course of the printing, printing is interrupted at the time of the detection of the foreign substance even though the printing is not completed over the paper.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An inkjet recording apparatus comprising:

an inkjet head that ejects ink on a printing medium;

a conveyance motor causing conveyance of the printing medium;

a discharge motor causing discharge of the printing medium;

a printing medium surface sensor, located at an upperstream side of the inkjet head apart from the inkjet head in a printing medium conveyance direction, that senses a [foreign substance representing an image printed] *color material that includes a resin and that is different from an ink adhered* on the printing medium beforehand; and a controller that drives the discharge motor to discharge a printing medium without ejecting ink from the inkjet head if an after-printing mode in which printing is made on the printing medium on which the image is printed beforehand is not set if the [foreign substance] *color material that includes the resin and that is different from the ink* is detected on the printing medium through the printing medium surface sensor, or drives the discharge motor to discharge a printing medium after ejecting ink on the printing medium from the inkjet head if the after-printing mode is set if the [foreign substance] *color material that includes the resin and that is different from the ink* is detected on the printing medium through the printing medium surface sensor.

2. The inkjet recording apparatus according to claim 1, further comprising a medium cassette that stores a plurality of the printing mediums, a length of the printing medium stored in the cassette in the printing medium conveyance direction being shorter than a distance between the printing medium surface sensor and the inkjet head.

3. The inkjet recording apparatus according to claim 1, wherein the recording medium surface sensor senses only an area on the printing medium where ink is ejected by the inkjet head if the after-printing mode is set.

4. The inkjet recording apparatus according to claim 1, wherein the controller validates the after-printing mode if printing is performed only on a fixed form of the printing medium on which the image of the fixed form is printed beforehand.

5. The inkjet recording apparatus according to claim 1, wherein the controller validates the after-printing mode if only a text data is printed on the printing medium on which the image is printed beforehand.

6. The inkjet recording apparatus according to claim 1, wherein the controller directs issuance of a warning information if the controller detects the [foreign substance] *color material that includes the resin and that is different from the ink* on the printing medium through the printing medium surface sensor if the after-printing mode is not set.

7. The inkjet recording apparatus according to claim 6, further comprising a display that displays the warning information.

8. The inkjet recording apparatus according to claim 1, wherein the controller directs issuance of a warning information if the controller detects the [foreign substance] *color material that includes the resin and that is different from the ink* in an after-printing area on the printing medium through the printing medium surface sensor if the after-printing mode is set.

9. The inkjet recording apparatus according to claim 1, wherein the controller detects both surfaces of a single printing medium through the printing medium surface sensor if the after-printing mode is set.

10. The inkjet recording apparatus according to claim 9, further comprising a medium guide pair that guides the printing medium conveyed, wherein the printing medium surface sensor includes a pair of printing medium surface sensors which is disposed at the opposite sides of the medium guide pair, respectively.

11. The inkjet recording apparatus according to claim 9, wherein the controller directs the discharge motor to discharge the printing medium without determining the state of the second surface if the controller determines that the [foreign substance] *color material that includes the resin and that is different from the ink* is present on the first surface of the printing medium.

12. The inkjet recording apparatus according to claim 1, wherein the controller directs the inkjet head to perform printing if the after-printing mode is set after the controller determines that the [foreign substance] *color material that includes the resin and that is different from the ink* is not present on a first and second surfaces of the printing medium.

13. The inkjet recording apparatus according to claim 12, further comprising a medium cassette that stores a plurality of printing mediums, a length of the printing medium stored in the cassette in the printing medium conveyance direction being shorter than a distance between the printing medium surface sensor and the inkjet head.

14. The inkjet recording apparatus according to claim 1, further comprising an interface that receives data from an external apparatus.

15. The inkjet recording apparatus according to claim 1, wherein the [foreign substance] *resin* is a transparent resin.

16. A method of printing by an inkjet recording apparatus comprising: conveying a printing medium by a conveyance motor;

judging whether a [foreign substance representing an image is present] *color material that includes a resin and that is different from an ink adhered* on the surface of the printing medium;

discharging the printing medium by a discharge motor without ejecting ink on the printing medium by an inkjet head, if an after-printing mode in which printing is made on the printing medium on which the image is printed beforehand is not set if the [foreign substance] *color material that includes the resin and that is different from the ink* representing the image is detected on the surface of the printing medium; and discharging the printing medium by the discharge motor after ejecting ink on the printing medium by the inkjet head, if the after-printing mode is set.

17. The method of printing by the inkjet recording apparatus according to claim 16, further comprising issuing a warning information if the controller detects the [foreign substance] *color material that includes the resin and that is different from the ink* in an after-printing area on the printing medium if the after-printing mode is set.

18. The method of printing by the inkjet recording apparatus according to claim 16, wherein the [foreign substance] *resin* is a transparent resin.

*19. The inkjet recording apparatus according to claim 1, wherein the printing medium surface sensor distinguishes whether the color material that includes the resin and that is different from the ink comprises black toner or color toner.*

*20. The inkjet recording apparatus according to claim 1, wherein the printing medium surface sensor is positioned so that the printing medium surface sensor senses an entire length of the printing medium for a color material that includes the resin and that is different from the ink before the printing medium is conveyed adjacent the inkjet head.*

* * * * *